UNITED STATES PATENT OFFICE.

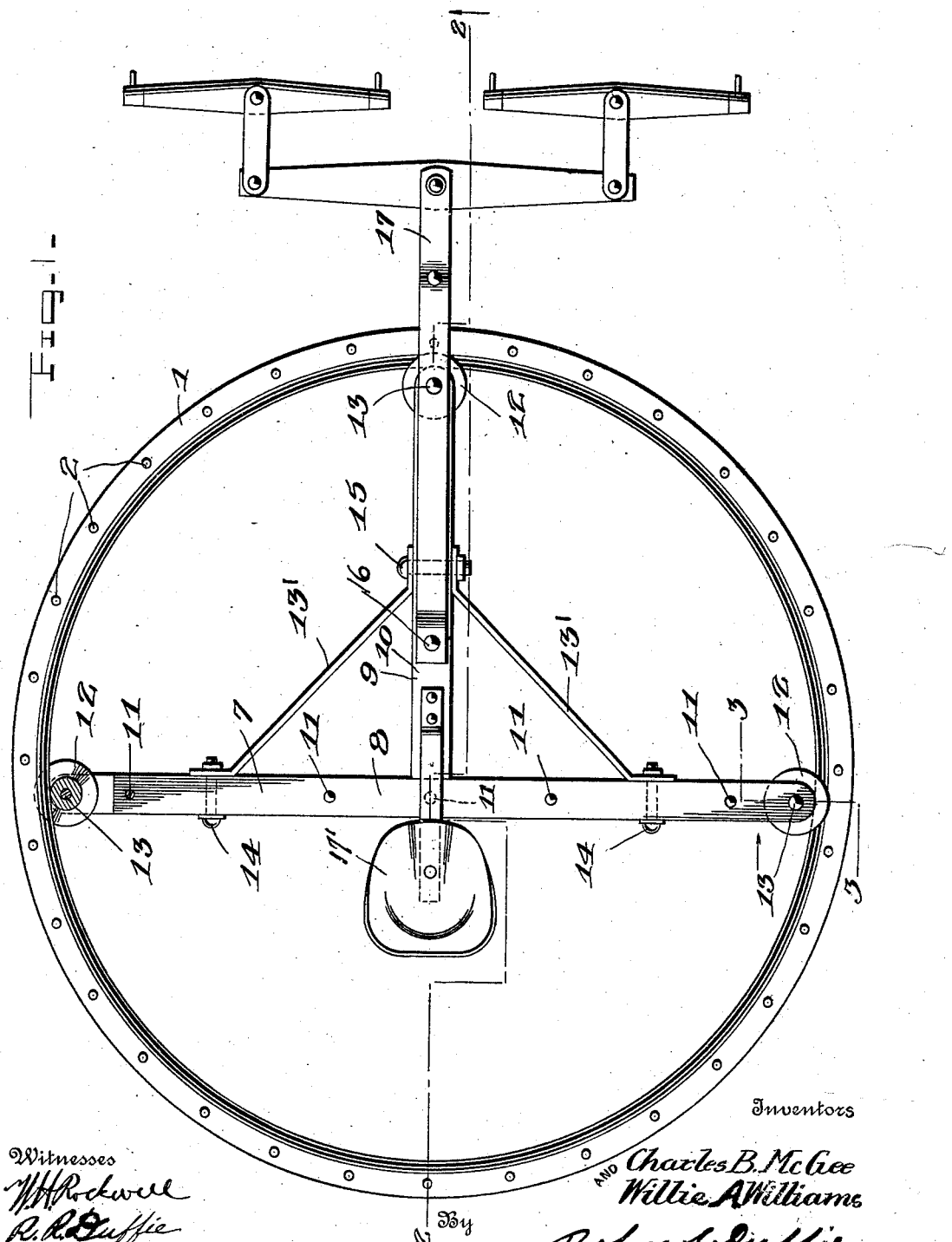

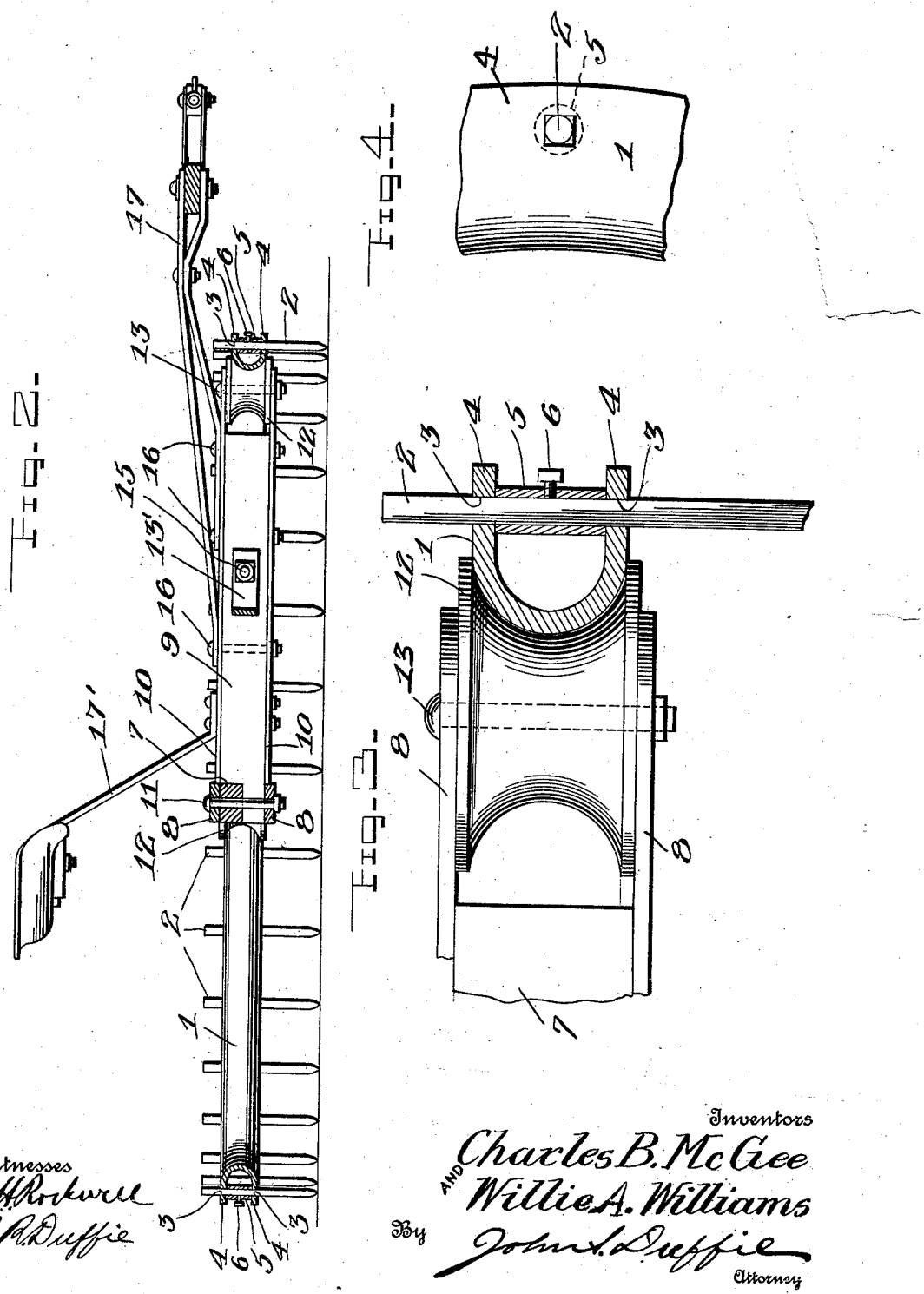

CHARLES B. McGEE AND WILLIE A. WILLIAMS, OF HARRISBURG, ARKANSAS.

ROTARY HARROW.

987,007.  Specification of Letters Patent.  Patented Mar. 14, 1911.

Application filed August 15, 1910. Serial No. 577,381.

*To all whom it may concern:*

Be it known that we, CHARLES B. MCGEE and WILLIE A. WILLIAMS, citizens of the United States, residing at Harrisburg, in the State of Arkansas, have invented certain new and useful Improvements in Rotary Harrows, of which the following is a specification.

Our invention has relation to improvements in rotary harrows and the main object of the same is to produce a harrow of the type above mentioned that will be efficient in operation, simple in construction and durable as to wear and tear.

Further objects of our invention are to provide a harrow that is easily turned at the end of a row or at the edge of a field; to provide a harrow that will easily pass stumps; to provide a harrow that will readily shed any trash that is picked up or collected thereby; and lastly, to provide a harrow which will wear its teeth evenly on all sides.

The ease with which our harrow revolves obviously prevents the teeth or the framework thereof from being injured by striking roots or stumps, which may be in the path of the same.

With the foregoing and other objects in view, our invention consists in the novel features of construction, combination and arrangement of parts as are fully described in this specification, illustrated in the accompanying drawings forming a part thereof and particularly pointed out in the claims appended.

Reference being had to the drawings; Figure 1 is a top plan view of our invention. Fig. 2 is a vertical, longitudinal, sectional view of our harrow taken on the line 2—2 of Fig. 1. Fig. 3 is a segmental, vertical, sectional view, showing on an enlarged scale some of the parts illustrated in Fig. 2. Fig. 4 is an enlarged, segmental, top plan view of the circular frame or runner, one of the tubings through which each tooth passes, being indicated by the dotted lines.

Referring more particularly to the drawings our invention, in detail, is described as follows:

The harrow is provided with a circular frame 1 of a U-shaped cross section. A plurality of harrow teeth 2, which have a square or rectangular cross section, each extends through similar perforations 3 in the upper and lower extensions or lips 4 of said frame 1. Interposed between the upper and lower lips of said frame are a plurality of square or rectangular tubings 5, through each of which one of said teeth 2 extends. A set screw 6 is provided in each tubing for the purpose of securing its respective tooth against vertical movement, after the same has been adjusted to the desired position.

The harrow teeth, perforations 3 and tubings 5 have been described as square or rectangular but we do not confine ourselves to any particular shape or design reserving the right to manufacture said teeth and tubing of a circular cross section if found desirable.

Extending transversely of the circular frame 1 is a beam 7, reinforced at its upper and lower faces by metallic strips 8. Extending forwardly from the central point of said beam 7 and mortised therewith is a beam 9 which is also reinforced by the metallic strips 10. Nut and bolt connections 11 pass through the corresponding parts of the transverse and longitudinal beams thereby securing them substantially together at right angles to each other. The transverse and longitudinal beams are each foreshortened, that is to say, they do not extend to the inner periphery of the circular frame 1. The metallic strips 8 and 10, however, do extend so that they are approximately even with the inner periphery of said frame. Rotatably mounted between each two corresponding extending portions of the metallic strips is a concave wheel or roller 12, each of which is rotatably held in position by means of a nut and bolt connection 13 passing through the center thereof and the extensions of its corresponding metallic strips. Said transverse and longitudinal beams are further strengthened by means of the braces 13', one end of each being secured to the transverse beam 7 by a respective nut and bolt connection 14, both being secured to the longitudinal beam 9 by means of a nut and bolt connection 15.

Secured to the forwardly extending or longitudinal beam 9 by suitable means, such as nut and bolt connections 16, is a draft appliance 17, which may be of any preferred construction and adapted to accommodate as many horses as desired. Also secured to the longitudinal beam by any suitable means adapted for the purpose is a seat 17' for the use of the operator or driver.

Although we have specifically described the construction, combination and arrangement of the several parts of our invention, yet we may reserve and exercise the right to make such changes or alterations therein, as do not depart from the spirit of the invention or the scope of the claims hereunto appended and which may be found necessary in the manufacture thereof.

Having described our invention what we claim as new and desire to secure by Letters Patent, is:

1. In a rotary harrow of the class described the combination of a circular frame with a transverse beam, said frame having a U-shaped cross section, a plurality of teeth adjustably held in the lips of the said frame, said transverse beam provided with a concave roller at each of its ends which roller contacts with the inner periphery of the frame, a longitudinal beam extending from the center of the transverse beam forwardly, said longitudinal beam also provided with a concave roller at its forward end which likewise contacts with the inner periphery of the frame, means whereby said longitudinal beam is secured at right angles to the transverse beam and draft means secured to the longitudinal beam.

2. In a rotary harrow of the kind described the combination of a circular frame having a U-shaped cross section with a transverse and a longitudinal beam, said frame provided with a plurality of teeth extending through perforations in the lips thereof, a tubing provided for each tooth interposed between the lips of said frame, each tooth passing through the hole in its respective tubing, means consisting of a set screw to secure each tooth against vertical movement, said transverse beam provided with a concave roller at each of its ends, the longitudinal beam provided with a concave roller at its forward end all of which rollers contact with the inner periphery of the frame and means whereby the longitudinal beam is secured at the center and at right angles to the transverse beam.

In testimony whereof we affix our signatures, in presence of two witnesses.

CHARLIE B. McGEE.
WILLIE A. WILLIAMS.

Witnesses:
R. L. COWAN,
FLOY NELMS.

---

Copies of this patent may be obtained for five cents each, by addressing the "Commissioner of Patents, Washington, D. C."